Dec. 15, 1936.   C. G. T. SALENIUS   2,064,496
SHOCK ABSORBER
Filed Nov. 5, 1934   2 Sheets-Sheet 1
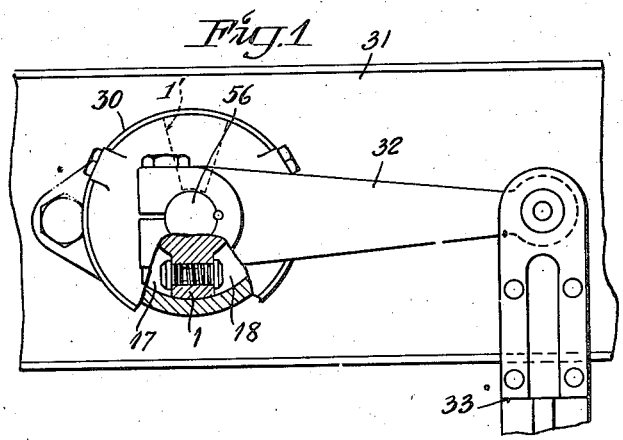
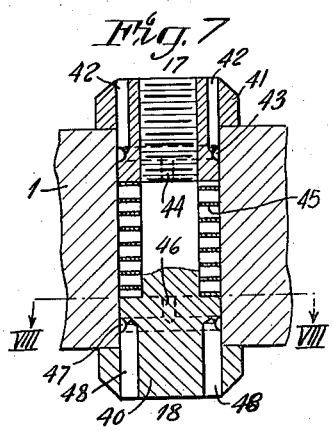
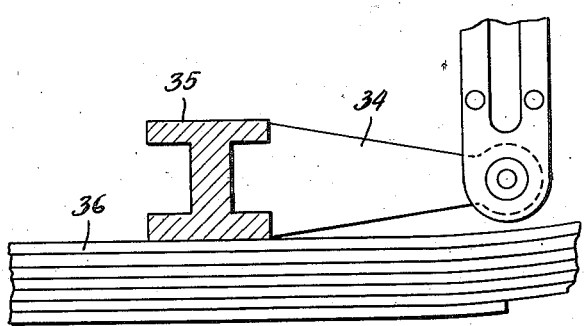
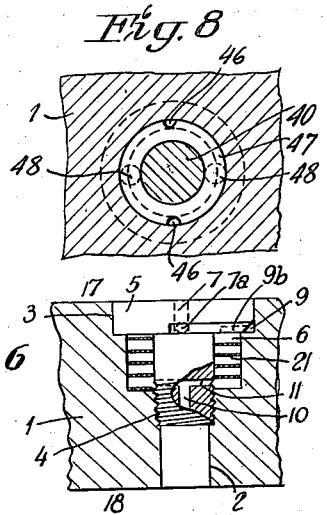
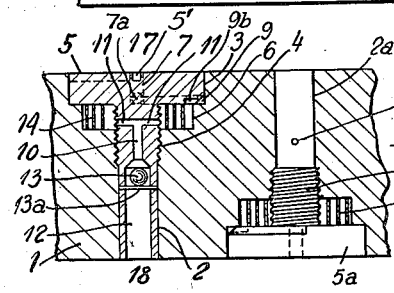
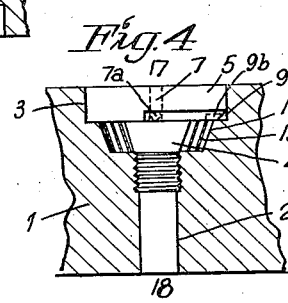
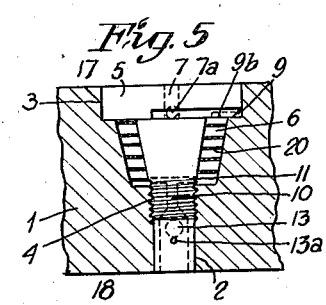
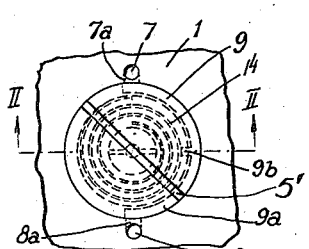
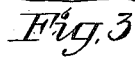

Dec. 15, 1936.   C. G. T. SALENIUS   2,064,496
SHOCK ABSORBER
Filed Nov. 5, 1934   2 Sheets-Sheet 2
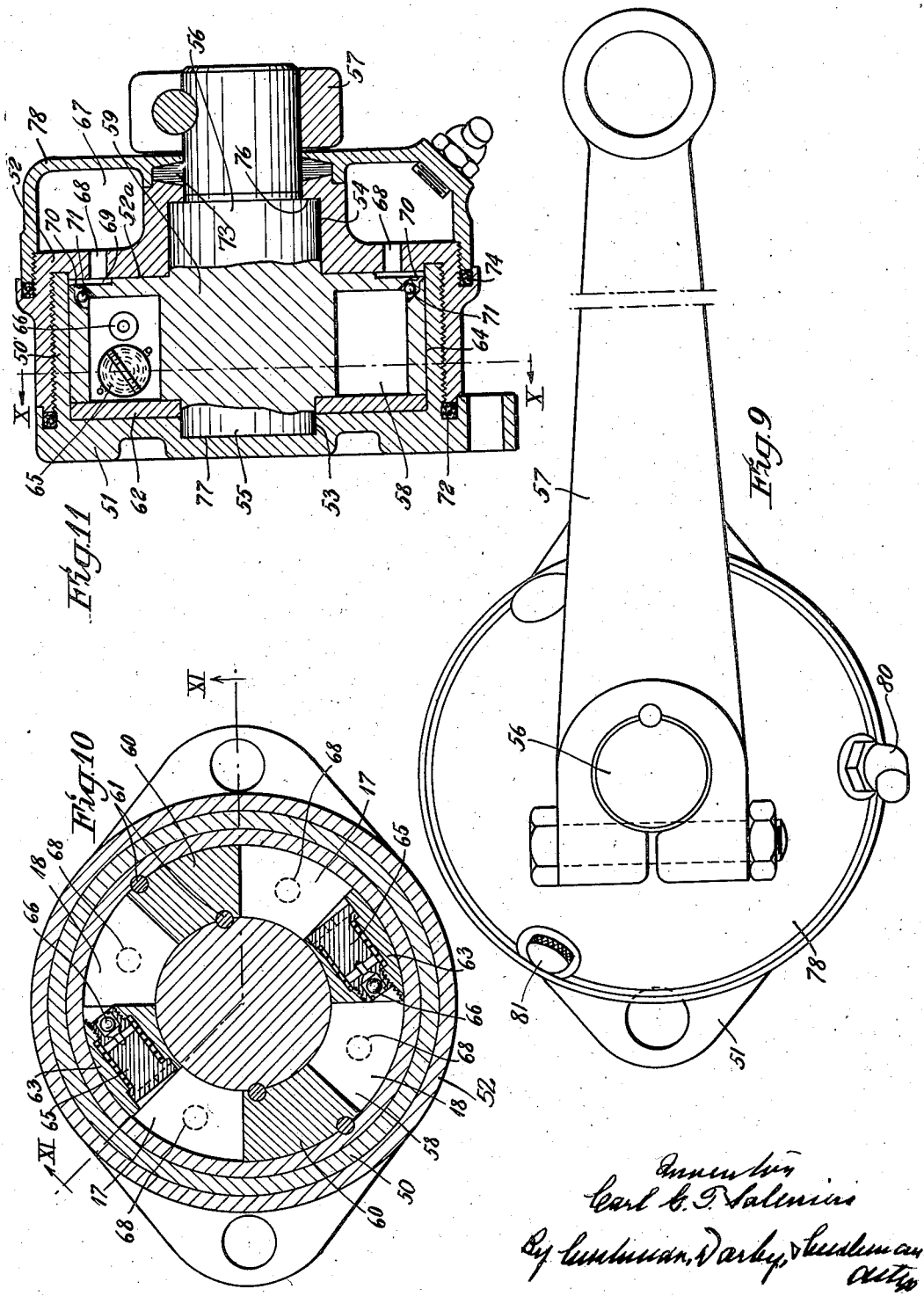

Patented Dec. 15, 1936

2,064,496

UNITED STATES PATENT OFFICE 2,064,496

SHOCK ABSORBER

Carl Gustav Thorbjörn Salenius, Stockholm, Sweden, assignor to Aktiebolaget Master Regulator, Stockholm, Sweden, a corporation of Sweden Application November 5, 1934, Serial No. 751,597
In Sweden November 7, 1933

8 Claims. (Cl. 188—89)

This invention relates to shock absorbers particularly intended to check excessive recoil of vehicle springs and is of that type which makes use of fluid pressure, the flow of which is more or less restricted.

The present invention has for its general object the provision of a shock absorber of simplified construction without valves operated by fluid pressure or by springs.

Another object of the invention is the improvement of the bearing and tightening conditions of the parts moving in contact with each other.

For a better understanding of the nature of the invention, together with further objects and combinations of parts, reference may be had to the accompanying drawings forming a part of this specification and the following description thereof.

In the drawings:—

Fig. 1 is a side elevation, partly in section, of a shock absorber mounted on the frame of a vehicle and showing the fixed partition member in dotted lines.

Fig. 2 is a longitudinal sectional view of one form of valve means for controlling the flow of the liquid in opposite directions through the shock absorbing piston.

Fig. 3 is a plan view of one of the valves shown in Fig. 2.

Figs. 4 to 6, inclusive, are sections similar to Fig. 2 but showing modifications.

Fig. 7 is a further modification of the part shown in Fig. 2.

Fig. 8 is a section on line VIII—VIII of Fig. 7.

Fig. 9 is an external view of a shock absorber similar to Fig. 1 but on an enlarged scale.

Fig. 10 is a section through the pressure chamber of the shock absorber shown in Fig. 9 on line X—X of Fig. 11.

Fig. 11 is a section on line XI—XI of Fig. 10.

Referring to Fig. 1, the shock absorber casing 30 is mounted on the frame 31 of a motor vehicle. Secured to a shaft 56, the function of which will be described later on, is an arm 32 the outer end of which is pivotally connected to the upper end of a link 33. The lower end of said link is pivotally connected to a member 34 made fast to the vehicle axle 35 which by means of a spring 36 is connected to the body of the vehicle. Within the shock absorber there are provided two chambers 17, 18 filled with working fluid and separated from each other by means of a piston 1 connected to the revoluble shaft 56 so as to be movable therewith and a partition member 1' which is fixed to the casing.

As shown in Fig. 2, the piston 1 is provided with an opening 2 the diameter of which at the end adjacent the pressure chamber 17 is enlarged as indicated at 3 and 6, the diameter of the portion 3 being greater than the diameter of the portion 6. Screwed into said opening is a screw 4 which forms a part of the controlling device. The head 5 of the screw 4 is located in the portion 3 of the opening 2. Two small apertures 7 and 8 are provided in the piston 1 at opposite sides of and adjacent to the screw head 5, said apertures communicating with the chamber 6 by means of channels 7a and 8a, 9 and 9a and a common discharge passage 9b formed between the walls of the portion 3 and an inner conical portion of the screw head, which portion extends round half the periphery of the head. Within the screw there is provided an axial channel 10 communicating by means of radial channels 11 with the chamber 6 on the one end and through an enlarged portion 12 with the discharge chamber 18 on the other end. A ball 13 located in the portion 12 of the channel and retained therein by means of a cross pin 13a serves as a non-return valve.

Around the screw 4 in the chamber 6 there is arranged a spiral formed spring-band 14 (see also Fig. 3) preferably consisting of brass and fitting loosely to the bottom of the chamber 6 and to the lower side of the screw head 5 and adapted freely to expand and contract under the influence both of pressure variations in the chamber 6 and of variations in temperature. Thus the band 14 may be allowed freely to expand and contract under the influence of varying liquid pressures and at the same time to tighten as much as possible against the upper and lower end surfaces of the chamber 6 to prevent direct communication between the coils through the clearances at the upper and lower surfaces of the band. It will be seen that when the liquid enters the chamber 6 through the passage 9b, its pressure will rise due to the restriction of passage caused by the space between the coils of the band 14. At the first moment, the coil located abreast of passage 9b will be forced in a direction towards the next coil, but contact between the coils is prevented, by the resistance to contraction exerted by the spring band due to its expansive force, and, by the working liquid being forced into the space between the coils, thereby producing a pressure directed outwardly against the pressure exerted upon the outer surface of the band. The same is true of the action of the liquid with respect to the second and third coil, etc. When the entire space between the coils is filled with liquid under pressure, the specific pressure exerted by the liquid upon the band 14 is substantially equal on both sides of the coils. Since, however, the total surface of the band directed outwardly of the center is greater than the total inner surface, the total pressure will be greater on the outer surface than on the inner surface, and the band will be contracted to an extent depending upon the amount of pressure and the resistance to contraction of the band, and the cross-sectional area available for the flow of liquid will thereby correspondingly be decreased. I prefer to make the spring-band very thin, for instance not thicker than 1/500 to 1/200 inch. The height of the band is preferably about 1/8". Also the space between the coils of the spring should be very small. The coefficient of expansion of the band should be greater than that of the surrounding casing which may consist of iron or steel.

Adjacent to the controlling device just described there is provided a similar controlling device the screw head 5a (Fig. 2) of which is located at that end of the piston 1 which is directed towards the chamber 18. While the first named controlling device permits flow of liquid only from chamber 17 to chamber 18, the second controlling device permits flow of liquid only in the opposite direction, that is from chamber 18 to chamber 17.

When the axle 35 and spring 36 move downwardly or away from the frame 31, the shaft 56, is rotated to move the piston towards the fixed partition 1' in a clock-wise direction, thus causing the pressure in the chamber 17 to rise and the liquid to flow from chamber 17 through the small apertures 7 and 8, channels 7a, 8a, 9a, and discharge passage 9b, chamber 6, through the spaces between the coils of the spiral spring 14, and through the radial channels 11 and axial channels 10 and 12 to the chamber 18. The outer surface of the screw head 5 is preferably provided with a kerf slot 5' for receiving a suitable tool to permit the convenient insertion and removal of the screw 4 from the piston 1.

A resistance to the flow of liquid arises in the narrow apertures 7, 8, and in the discharge passage 9b where the streams of liquid discharged from the channels 9 and 9a strike each other. As will be seen from the drawings, the members enclosing the channels 9 and 9a are arranged immovably with respect to each other, said channels thus forming a passage of constant cross section. The discharge passage 9b is sufficiently restricted to cause the liquid streams to be damped prior to entering the chamber 6. Due to the action of the streams upon each other and due to the contraction of the spring and decrease in cross section between the coils under the influence of the pressure, the last-mentioned resistance will vary in response to the intensity of the shock. The spiral-formed band 14 also works as a thermostat, since, as pointed out above, the space between the coils is varying in response to changes in temperature.

If the piston 1 is moved in a counter clockwise direction, the pressure in the chamber 18 will rise and a restricted flow of liquid will take place in the opposite direction through a similar but oppositely disposed valve. The ball valve 13 of the first valve is then closed.

In the embodiment shown in Fig. 4, the spiral-formed band 19, the walls of the chamber 16 and the corresponding portion of the screw 4 are formed conically.

In the embodiments shown in Figs. 5 and 6, the spring-band 20, 21, respectively, is wound in the form of a screw, Fig. 5 showing a conical form and Fig. 6 a cylindrical form of the chamber 6 and the spring.

The operation of the embodiments shown in Figs. 4 to 6 is the same as that described with reference to Figs. 2 and 3.

According to the embodiment illustrated in Figs. 7 and 8, which incidentally is the form of valve shown in Figure 1, a screw 40 is provided in the opening between the chamber 17 and 18. The screw is held in its position by means of a nut 41. The spring 45 is wound around the bolt of the screw. The device shown in Figs. 7 and 8 is adapted for double-action, flow of liquid being possible both from the chamber 17 to the chamber 18 and vice versa. In operation, liquid flows from chamber 17 through channels 42 provided in the nut 41, annular peripheral grooves 43, axial grooves 44 provided at the periphery of the nut through the spaces between the screw-formed spring 45, axial grooves 46 provided at the periphery of the screw 40 (see also Fig. 8), annular peripheral grooves 47 and through the channels 48 provided in the screw into the chamber 18 or vice versa. Of course, the spring 45 and the cooperating parts may have another form, for instance be shaped conically as in Fig. 5.

The spring serves its purpose even in the case if there is only one channel provided between the chambers 17 and 18 and the spring is located in this channel. I wish, therefore, to point out that the invention is not limited to the use of the small channels described above.

According to Figs. 9 to 11, the casing of the shock absorber comprises a bottom plate 51 and a cover or cap portion 52 secured thereon by means of threads. Provided in these parts are bearings 53, 54 for the journals 55, 56 formed on the rotatable part 59 of the shock absorber. The rotatable part, which in the above described manner receives its movement through the agency of an arm 57 secured to the shaft journal 56, is provided with a portion projecting radially between the shaft journals, in which portion is provided an annular groove 58 extending axially in the example of embodiment illustrated. The groove 58, which forms the working chamber or chambers of the shock absorber, is disposed entirely within the rotatable part 59 and preferably has a square or rectangular cross section. Arranged in the groove are radial partitions or screens 60 fitting tightly to the outer and inner walls and the bottom of the groove, and which partitions or screens are rigidly connected with the movable part, for instance by means of pins 61 or in any other convenient manner, as by welding, soldering or the like. Obviously, they may also be made integral with the movable part.

Secured on the bottom plate 51 or on a part non-rotatably connected therewith, such as a plate 62, are abutment screens 63 entering the groove 58 between the fixed partitions 60 on the rotatable part, so that working chambers 17 and 18 are formed between the screens and the partitions, which chambers may in known manner serve as pressure or suction chambers. In the example shown, there are four such chambers, but the number may evidently vary to a great extent. The open end of the groove bears with a tight fit against the plate 62 carrying the screens 63, or, if such a plate is lacking, against the inner plane ground surface of the plate 51. The cylindrical flange 59 of the bottom plate 51 and the inner vertical surface 52a of the cap member 52 are accurately adapted to the portion of the rotatable part enclosing the groove 58, so that a good bearing effect is obtained both in the radial and in the axial direction, while all surfaces abut at the same time against each other with a good liquid-tight fit. The portion of the part 59 enclosing the working chambers will thus in this case act as a bearing part co-operating with the casing, the bearing surface 64 adapted for radial bearing then extending over the whole of the axial length of this portion. As will be seen, the rotatable part will be mounted in the casing along the whole or practically the whole of its extension within the casing.

With respect to its operation, the shock absorber acts in a manner known per se. When the arm 57 swings, the portion 59 and thus the partitions 60 are turned, said partitions then acting as pistons or vanes and moving relatively to the screens 63 secured in the casing, so that the volume of the working chambers serving as pressure chambers is reduced, while a back pressure is provided by the impeded discharge of the liquid taking place through suitable formed valves 65 and non-return valves 66 to the adjacent working chamber. In the example shown, these valves are arranged in the screens 63 rotatably connected with the casing, but they may just as well be arranged in the pistons 60. Each of the valves 65 permits the flow of the liquid in one direction and has associated therewith a similarly formed valve (not shown) which allows the liquid to flow in an opposite direction so as to be substantially similar in construction and operation to the valve shown in Figure 6.

By a cap 78, which is secured to the cap member 52, a receptacle 67 is formed for pressure liquid, which is disposed axially laterally of the working chambers. The receptacle communicates with the working chambers 17 and 18 through channels 68 and a preferably annular turned-down portion 69 in the part 59 and through channels 70 controlled by ball valves 71. The ball valves open in a manner known per se when a pressure below atmospheric is produced in the working chambers, and admit pressure liquid from the collecting receptacle 67, and again close on a rise in the pressure.

The channels 68 and 69 are so arranged that any existing tightening packings between the various parts of the casing and between such parts and the rotatable part are unloaded from the pressure occurring in the working chambers, the collecting receptacle then serving as an equalizing chamber, which through the channels communicates directly with those points where leakage of liquid from the working chambers may possibly occur. In the embodiment shown, the packing 72 between the parts 51 and 52 and the shaft packing 73 are considered here. In addition to these packings there is a packing 74 between the parts 52 and 78, which packing, however, is only subjected to the pressure prevailing in the collecting container.

As the mounting of the part 59 is as complete as possible, no wear will occur in the fixed screens 63 movable relatively to said part at the tightening edges of said screens bearing tightly against the limiting surface of the groove. Therefore, no detrimental wear will be produced between the parts limiting the pressure chamber. The plate 62 carrying the screens 63 may be immovably secured in the casing.

In the example shown, the groove 58 is divided into four chambers disposed all around the circumference, by reason of which the groove 58 is completely annular. The groove, which shall always be concentric to the geometric axis of the rotatable part, need not be completely annular, however.

The vertical surface of the portion enclosing the working chambers, which surface bears against the surface 52a, acts as an axial bearing surface to take up the pressure strains produced on a rise of the pressure in the working chambers. This surface may be made sufficiently large in order thereby to avoid detrimental wear. The journal 56 may also have a radial surface 76 for taking up axial strains. The end surface 77 of the journal 55 also serves as a thrust bearing surface.

In the example of embodiment shown, the portion of the rotatable part enclosing the groove 58 is made integral with the shaft or the shaft journals.

The collecting chamber 67 is provided with an opening preferably situated at the bottom, in which is arranged a nipple 80 for the injection of the working liquid under pressure. Provided in the upper part of the collecting chamber is a special air valve 81 which is preferably manually controlled. The working liquid, generally oil, is pressed into the receptacle 67 at so great a pressure that it may be brought through the channels 68, 69, 70 into the working chambers entirely to fill the same. This filling pressure may be controlled by means of the air valve 81, through which also the necessary removal of air may take place to make possible the filling of the chamber 67 with working liquid.

What I claim is:—

1. A hydraulic shock absorber comprising a casing provided with an enclosed liquid chamber, a fixed partition member within said chamber, a shaft extending into the chamber and having a piston member connected thereto, said partition member and said piston member dividing the chamber into working chambers, means in one of said members for conducting liquid from one working chamber to its adjacent working chamber, said means including a pair of channels having opposed inlet openings and channeled portions extending towards each other, said portions terminating in a common restricted discharge passage whereby to conduct the liquid streams toward each other and dampen the flow of liquid issuing from the channels.

2. A hydraulic shock absorber comprising a casing provided with an enclosed liquid chamber, a fixed partition member within said chamber, a shaft extending into the chamber and having a piston member connected thereto, said partition member and said piston member dividing the chamber into working chambers, means in one of said members for conducting liquid from one working chamber to its adjacent working chamber, said means including a pair of channels having diametrically opposed inlet openings and channeled portions extending towards each other and terminating in a common discharge passage having a restricted port so as to dampen the flow of liquid issuing from said channel, the discharge end of the channels being disposed at an angle in excess of 90° with each other.

3. A hydraulic shock absorber comprising a casing provided with an enclosed liquid chamber, a fixed partition member within said chamber, a shaft extending into the chamber and having a piston member connected thereto, said partition member and said piston member dividing the chamber into working chambers, means in one of said members for conducting liquid from one working chamber to its adjacent working chamber, said means including a passage chamber, and a coil band spring in said passage chamber having its coils forming a passage for the flow of liquid and adapted to vary the size of the passage in accordance with variations in the pressure of the liquid passing therethrough.

4. A hydraulic shock absorber comprising a casing provided with an enclosed liquid chamber, a fixed partition member within said chamber, a shaft extending into the chamber and having a piston member connected thereto, said partition member and said piston member dividing the chamber into working chambers, means in one of said members for conducting liquid from one working chamber to its adjacent working chamber, said means including a passage chamber, and a coil band spring in said passage chamber having its coils forming a passage for the flow of liquid and adapted to vary the size of the passage in accordance with variations in the pressure of the liquid passing therethrough, said spring being formed of a material having a greater coefficient of expansion than the parts constituting the passage chamber.

5. A hydraulic shock absorber comprising a casing provided with an enclosed liquid chamber, a fixed partition member within said chamber, a shaft extending into the chamber and having a piston member connected thereto, said partition member and said piston member dividing the chamber into working chambers, means in one of said members for conducting liquid from one working chamber to its adjacent working chamber, said means including a passage chamber, and a coiled thermostatic spring in said passage chamber having its coils forming a passage for the flow of liquid, the width of said passages arranged to be varied in accordance with variations in the pressure of the liquid passing therethrough and in accordance with variations in temperature.

6. A hydraulic shock obsorber comprising a casing provided with an enclosed liquid chamber, a fixed partition within said member, a shaft extending into the chamber and having a piston connected thereto, said partition and said piston providing the chamber into separate working chambers, means in said piston for conducting liquid from one working chamber to its adjacent working chamber, said means including chambers of constant passage area arranged to conduct the liquid streams towards each other, a common discharge passage communicating with said channel, said discharge passage having a restricted opening to dampen the flow of liquid issuing from said channels, a conduit communicating with said discharge passage, and a non-return valve in said conduit to permit flow of liquid only in one direction through said piston.

7. A hydraulic shock absorber comprising a casing provided with an enclosed liquid chamber, a fixed partition within said chamber, a shaft extending into the chamber and having a piston connected thereto, said partition and said piston providing the chamber into separate working chambers, means in said piston for conducting liquid from one working chamber to its adjacent working chamber, said means including chambers of constant passage area arranged to conduct the liquid streams towards each other, a common discharge passage communicating with said channel, said discharge passage having a restricted opening to dampen the flow of liquid issuing from said channels, a passage chamber communicating with said discharge passage, and a coil band spring in said passage chamber having its coils forming a passage for the flow of liquid and adapted to vary the sides of the passage in accordance with variations in the pressure of the liquid passing therethrough.

8. A hydraulic shock absorber comprising a casing provided with an enclosed liquid chamber, a fixed partition within said chamber, a shaft extending into the chamber and having a piston connected thereto, said partition and said piston providing the chamber into separate working chambers, means in said piston for conducting liquid from one working chamber to its adjacent working chamber, said means including chambers of constant passage area arranged to conduct the liquid streams toward each other, a common discharge passage communicating with said channel, said discharge passage having a restricted opening to dampen the flow of liquid issuing from said channels, a passage chamber communicating with said discharge passage, a coil spring in said passage chamber having its coils forming a passage for the flow of liquid and adapted to vary the size of the passage in accordance with variations in the pressure of the liquid passing therethrough, a conduit communicating with said discharge passage and a non-return valve in said conduit to permit flow of liquid only in one direction through said piston.

CARL GUSTAV THORBJÖRN SALENIUS.